United States Patent
Teichmann

[11] Patent Number: 6,081,331
[45] Date of Patent: Jun. 27, 2000

[54] SPECTROMETER

[75] Inventor: Helmut Teichmann, Zürich, Switzerland

[73] Assignees: Gretag-Macbeth AG, Regensdorf, Switzerland; M Squared Technology Limited, Devon, United Kingdom; Centre Suisse d'Electronique et de, Zurich, Switzerland

[21] Appl. No.: 09/265,837

[22] Filed: Mar. 10, 1999

[30] Foreign Application Priority Data

Mar. 11, 1998 [EP] European Pat. Off. ............... 98104395
Jan. 13, 1999 [EP] European Pat. Off. ............... 99100338

[51] Int. Cl.$^7$ ....................................................... G01J 3/18
[52] U.S. Cl. ............................................................ 356/328
[58] Field of Search ................................... 356/326, 328, 356/334, 305; 385/37

[56] References Cited

U.S. PATENT DOCUMENTS

| 4,744,618 | 5/1988 | Mahlein ..................................... 385/37 |
| 4,983,039 | 1/1991 | Harada et al. ........................... 356/328 |
| 5,026,160 | 6/1991 | Dorain et al. ........................... 356/328 |

FOREIGN PATENT DOCUMENTS 0489286  6/1992  European Pat. Off. .

*Primary Examiner*—F. L. Evans
*Attorney, Agent, or Firm*—Burns, Doane, Swecker & Mathis, LLP

[57] ABSTRACT

A spectrometer having an optical arrangement for capturing light to be measured and the separation of the light into spectral portions with a light entry, a reflecting diffraction grating and an exit surface from which the spectrally separated light to be measured exits is disclosed. The optical arrangement includes an at least partially transparent carrier body which is defined by two opposite end surfaces whereby the light entry, the reflecting diffraction grating and the exit surface are located on the side of the first of the two end surfaces of the carrier body and the second of the two end surfaces includes a reflective concave mirror which collimates the entering light and reflects it onto the reflecting diffraction grating and focuses the light diffracted by the reflecting diffraction grating onto the exit surface, whereby the light entry and the exit surface are spaced apart and dispersion of the light in the exit surface is at least about perpendicular to a line of connection between the light entry an the exit surface.

20 Claims, 3 Drawing Sheets

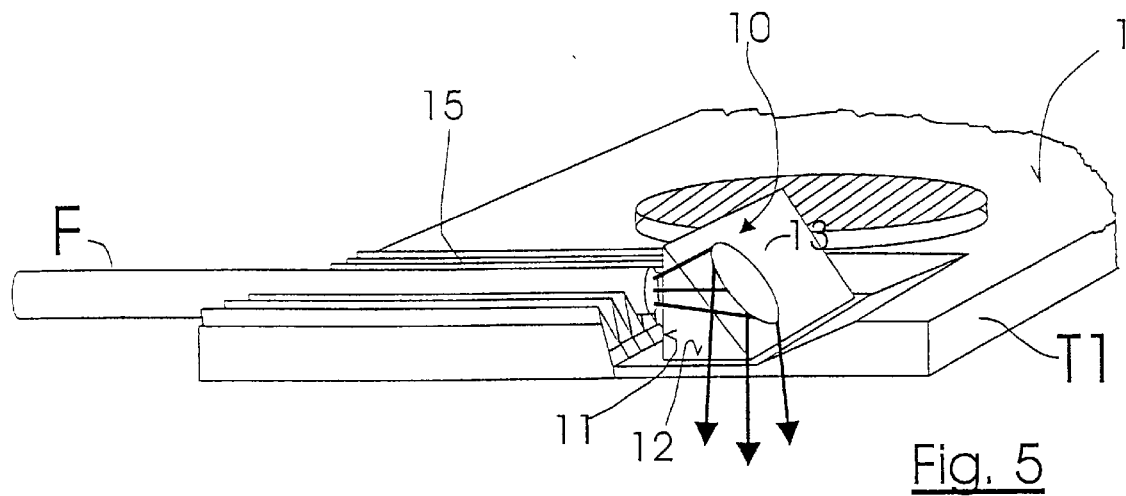
Fig. 5
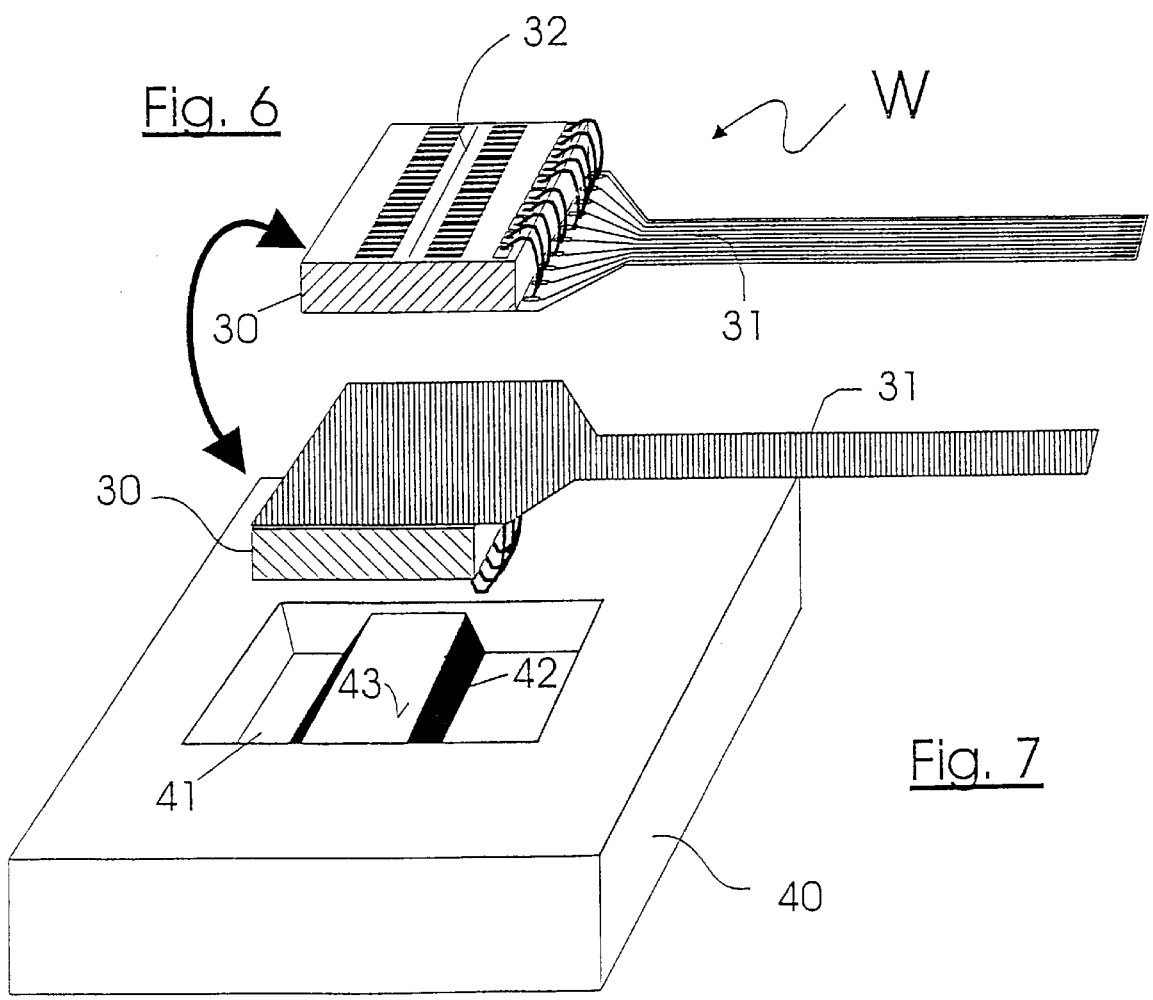
Fig. 6
Fig. 7

SPECTROMETER

This application claims priority under 35 U.S.C. §§119 and/or 365 to 98104395.3 and 98100338.5 filed in Europe on Mar. 11, 1998 and Jan. 13, 1999, respectively; the entire content of which is hereby incorporated by reference.

FIELD OF THE INVENTION

The invention relates to a spectrometer. In particular, the invention relates to a spectrometer with an optical arrangement for collecting light to be measured and splitting it into spectral portions.

BACKGROUND OF THE INVENTION

The fields of use of such spectrometers are manifold. Typical applications are, for example, in colour detectors for the graphic industry or the food industry, in apparatus for the control of industrial processes, in measuring apparatus for clinical diagnostics, and so on.

A known generic spectrometer is described, for example, in EP-A-0 489 286. In this known measuring head, the carrier body is constructed as a relatively thick bi-convex lense, whereby the light entry gap and the photoelectric converter arrangement, which is constructed as a diode line, are positioned on one and the diffraction grating is positioned at the other of the curved surfaces of the bi-convex lense. With this construction, a relative simple manufacture and adjustability with good optical correction is achieved, however this construction requires the use of a curved, in general aberration-corrected, concave grating.

This requirement can be avoided with the use of spectrometers according to the Fastie-Ebert-principle—as described, for example, in the patent specification U.S. Pat. No. 4,744,618 "Demultiplexer". However, such spectrometers have the disadvantage that they can only be operated in general in positive defraction order and with an inclined grating—as shown, for example, in FIG. 11 of the mentioned patent specification, U.S. Pat. No. 4,744,618.

SUMMARY OF THE INVENTION

Based on the current state of the art, it is now an object of the present invention to conceptionally improve a spectrometer of this generic type so that it can be mass-produced without substantive loss of optical properties and manufactured substantially easier and more economically than comparable known spectrometers, and otherwise provides the prerequisite for miniaturization. This is achieved in a simple spectrometer construction without the use of concave gratings, especially with the introduction of a new optical arrangement. According to the new optical arrangement of the invention, the grating is preferably oriented such that the grating lines (grating grooves) are directed away from one side of the grating which is adjacent the light entry. The grating is preferably positioned about between the light entry and the light exit. It is especially preferred when the light entry and the light exit are directly adjacent the grating in order to guarantee a compact arrangement. The grating line or grating grooves are thereby preferably directed, as already mentioned, away from the light entry and towards that side of the grating which is located on the side of the light exit is located. It is especially preferred to produce with the selected arrangement of light entry, grating and light exit, and with the selected grating orientation, a direction of the spectral diffraction in the exit plane which is referred to in the following as "dispersion direction R", which is at least about perpendicular to a line connecting the light entry with the light exit region and in which the focal points of the individual spectral portions are located. The connecting line preferably extends between the light entry and one at least about centrally located point of the planar light exit region.

A negative diffraction order can be used with this arrangement—contrary to the arrangement shown in FIG. 11 of the patent specification, U.S. Pat. No. 4,744,618—so that the light entry and the exit surface are located on the same side of the grating relative to the dispersion direction R, whereby an especially compact arrangement can be achieved together with only a small deformation of the focal points. Furthermore, the diffraction grating can be positioned at least about perpendicular to the axis of symmetry A of the spectral module body.

Furthermore, by way of the integral use of integrated microstructures, for example, dimple structures or microprisms in the region of the light entry and the photoelectrical converter arrangement, which are manufactured simultaneous with those of the grating, the reproducible assembly of further system components, for example, the input fiber or fibers is facilitated and a cost-effective mass production achieved. Further novel technical aspects reside in the realization of this concept, for example, in the segmented vapour depositing of the concave mirror surface for optimization of light scatter suppression in the spectrometer.

BRIEF DESCRIPTION OF THE DRAWINGS

The invention will be further described in the following with reference to the drawings. It show.

In the Figures, corresponding parts are referenced by the same reference numbers. Features of different embodiments can be combined with one another.

Figure 1:
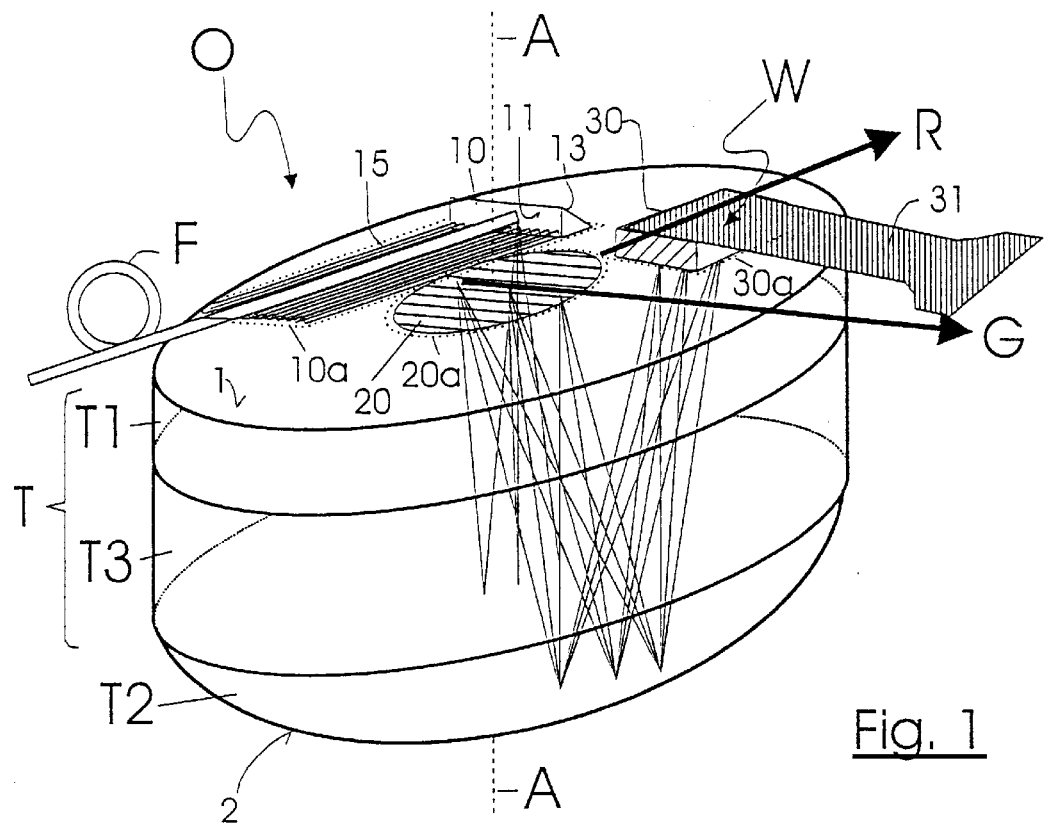
FIG. 1 a first exemplary embodiment of a spectrometer in accordance with the invention, FIG. 2 a slightly modified second embodiment, and FIG. 3 a top plan view of the surface in which the diffraction grating is located, FIG. 4 a perspective illustration of the light path in the carrier body (without illustration of the microstructures), FIGS. 5 to 7 each an enlarged sketch.

The spectrometer illustrated in FIG. 1 includes essentially two main components, namely, an optical arrangement defined as unit 0 and a photoelectric converter arrangement designated W.

The photoelectric converter arrangement W is, for example, a commercially available linear CMOS-photodiode matrix, for example, of the type S5463-256 of Hamamatsu, or an also commercially available CCD-detectormatrix. It includes a detector chip 30 with the photodiodes included therein, which chip is normally enclosed in a detector housing, not illustrated here. A band cable 31, for example, can be used for connection with an external control and evaluation electronic, not illustrated. Such photodiode fields and their electric control are known to the person skilled in the art—also in connection with spectrometers, see, for example, the above-mentioned EP-A-0 489 286—and, therefore, need not be discussed in detail.

The optical arrangement O consist essentially of a carrier body T which is essentially transparent within the band width of interest, which carrier body includes all optical components necessary for the spectral splitting of the measured light. The carrier body T further has an external cylindrical shape with an end-standing, dome-shaped cap, which means it includes an essentially planar first end surface 1 and an opposite end surface 2 which is rotation symmetrical and spherically or parabolically curved and (inwardly) concave, as well as an un-labelled cylindrical mantle surface which is unimportant for the function of the optical arrangement. The plane of the first end surface 1 is preferably perpendicular to the axis of symmetry A of the rotation-symmetrical second end surface 2.

In or on the first end surface 1 of the carrier body T is provided a measured light entry formed by an input coupler structure in the form of a microprism 10 and a reflecting diffraction grating 20. The detector chip 30 of the converter arrangement W is also positioned on the first end surface 1 of the carrier body T. For easier manufacture and adjustability, the reflecting diffraction grating 20 is formed essentially planar and without aberration correction and is centered relative to the axis of symmetry A of the concave end surface 2, whereby the direction G of the grating grooves is oriented parallel to a line connecting the light entry with a central point of the planar region (30a) in which the focal points of the individual spectral portions are located. The microprism 10 forming the input coupler structure includes a light entry surface 11 which is essentially perpendicular to the first end surface 1, a light exit surface 12 (illustrated in FIG. 5) parallel to the end surface 1 and a rear surface 13 inclined at about 45° thereto, and made reflective, for example, by a vapour-deposited layer of aluminum. Light to be measured which is directed thereinto parallel to the first end surface 1 is thereby deflected at double the prism angle and coupled into the carrier body T at a small predefined angle to the axis of symmetry A of the second end surface 2. The microprism 10 is preferably directly formed onto the first end surface 1 or formed therein, whereby the light exit surface 12 is then not present as a separate feature.

A groove structure 15 is formed on the first end surface 1, immediately before the microprism 10, which structure consists of grooves that are perpendicular to the light entry surface of the microprism 10, which grooves, for example, 16 grooves, preferably have a V-shaped cross section and are, for example, each 170 μm wide and 100 μm deep. This groove structure 15 serves the positioning of one (or more) light-guiding fibers F on the first end surface 1, through which light-guiding fiber, the light to be analysed, is guided to the microprism 10 and, therefore, to the carrier body T of the spectrometer. The light exit end of the light guide fiber(s) is directly affixed to the light entry surface 11 of the microprism 10 by way of an index matched adhesive. The mounting of the light guide fiber(s) on the carrier body T is achieved in an appropriate manner (for example, by adhesion) and is not illustrated for reasons of clarity.

The detailed construction of the microprism 10 and the groove structure 15 is shown enlarged view in FIG. 5.

The construction of the input coupler structure with a deflecting prism permits light input parallel to the first end surface 1 of the carrier body, whereby a substantially lower height of the total spectrometer is achieved compared to the conventional light input perpendicular to the end surface.

The groove structure 15 is used, as already mentioned, for the positioning of the light guide fiber(s) F on the first end surface 1 of the carrier body T, whereby tension relief and breakage protection is achieved for the fibers in a simple manner. The groove structure 15 further defines a plurality of selectable input coupling positions and, thereby, a further degree of freedom at the end of the manufacturing process (see also further below). Furthermore, as already mentioned, several light guide fibers F can be provided side-by-side through which light from several different light sources or from one and the same light source can be supplied. This results in the latter case in higher light throughput, while it enables in the former case the sequential measuring of several light sources without an additional optical multiplexer.

The diffraction grating 20 is formed directly in the first end surface 1 of the carrier body T by a corresponding local surface structure of the end surface and a reflective coating applied to this surface structure, whereby the grating grooves are oriented in direction G. Typically, the diffraction grating 20 is an essentially planar, not aberration corrected line grating with 800 lines per mm. For spectral analysis applications in the visible spectrum the reflective coating preferably consists of aluminum.

The second end surface 2 of the carrier body is provided on the outside with a highly reflective coating, for example, a vapour deposited aluminum coating, and thereby provides a spherical or parabolical concave mirror (as seen from the inside). As is apparent from the following discussion, the concave mirror is exposed to light in only two relatively small regions. It is therefore also possible not to render the whole surface of the second end surface 2 reflective, but only the regions (segments) actually exposed to light. This allows not only an improved suppression of light scattering, but also a reduction of the effective numeric aperture and an influencing of the available band width. Furthermore, higher orders of diffraction can thereby also be suppressed. Of course, it is also possible to render only a single continuous segment of the second end surface rather than two discrete segments.

As is apparent from FIG. 1, the spectrometer provides a folded light path, whereby the light to be measured is reflected a total of three times on its way from the light entry (microprism 10) to the converter arrangement W—once on the reflecting diffraction grating 20 and twice on the concave second end surface 2 of the carrier body T. A very short structure is thereby achieved at a large focal length. The light to be measured which is supplied through the light guide fiber F essentially parallel to the first end surface 1 is deflected by the microprism at twice the prism angle, so that it enters the carrier body T essentially perpendicular to the first end surface 1 (with a fixed numerical aperture determined by the light guide fiber F). It is then reflected the first time by the concave second end surface 2 and collimated onto the diffraction grating 20 on the first end surface 1. Because of the selected orientation G of the grooves of the reflecting diffraction grating 20, the light to be measured is then reflected back onto the reflective second end surface 2, whereby a spacial separation according to wave length (dispersion) is simultaneously achieved in a generally known manner. The direction of the spectral separation R is thereby approximately perpendicular to a line of connection between the light entry and a central point of the planar region (30a) wherein the focal points of the individual spectral portions are located. The light to be measured is now reflected a second time on the second end surface 2 and finally directed to the converter arrangement W. The dimensions of the carrier body T and the positioning of the light entry 10, the reflecting diffraction grating 20 and the converter arrangement W, which means the optical path of the light to be measured, are thereby selected such that the exiting array of beams which are spread out according to wave length is focussed at the location of the converter arrangement W, so that the focal plane of the exiting array of beams coincides with the light-sensitive elements (photodiodes) in the detector chip 30 of the converter arrangement. The individual, typically each 25 μm wide photodiodes of the linear photodiode array are thereby subjected to light of different wave lengths and the corresponding electrical signals produced by these photodiodes represent the spectral intensity portions of the light to be analysed.

Figure 3:
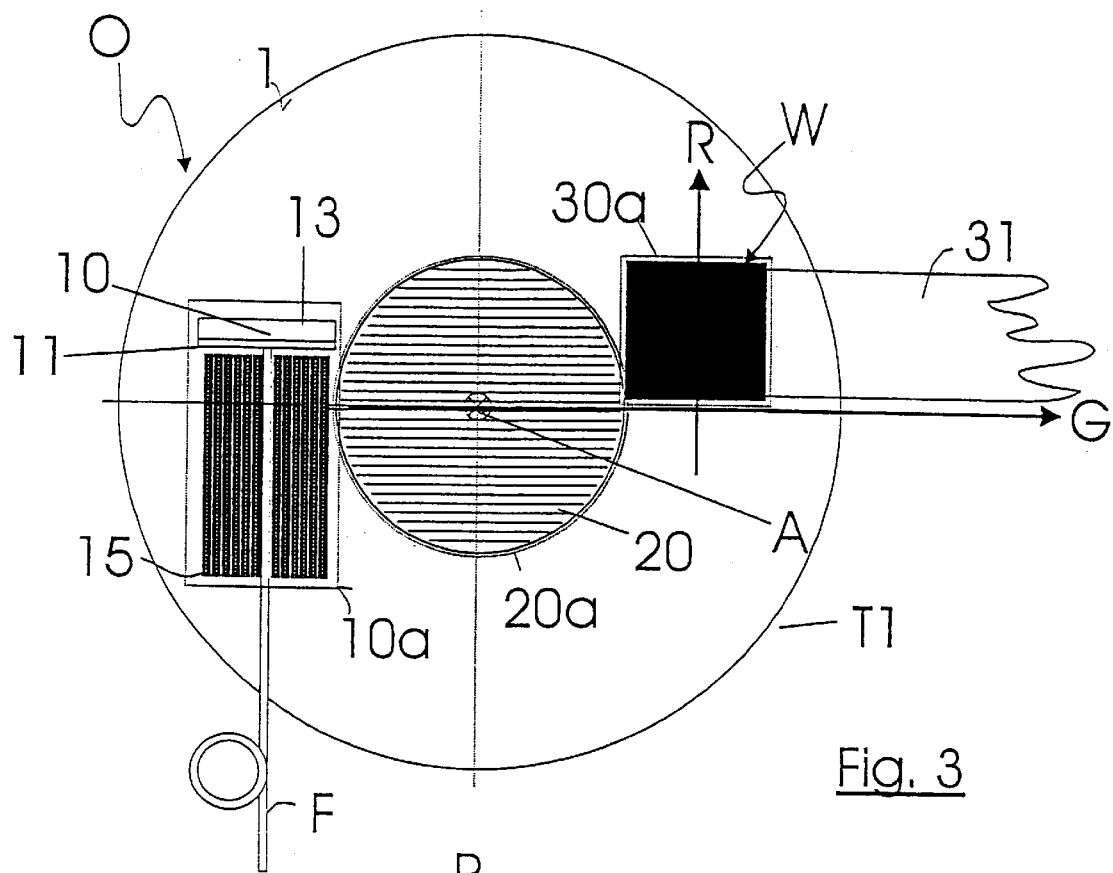
Figure 4:
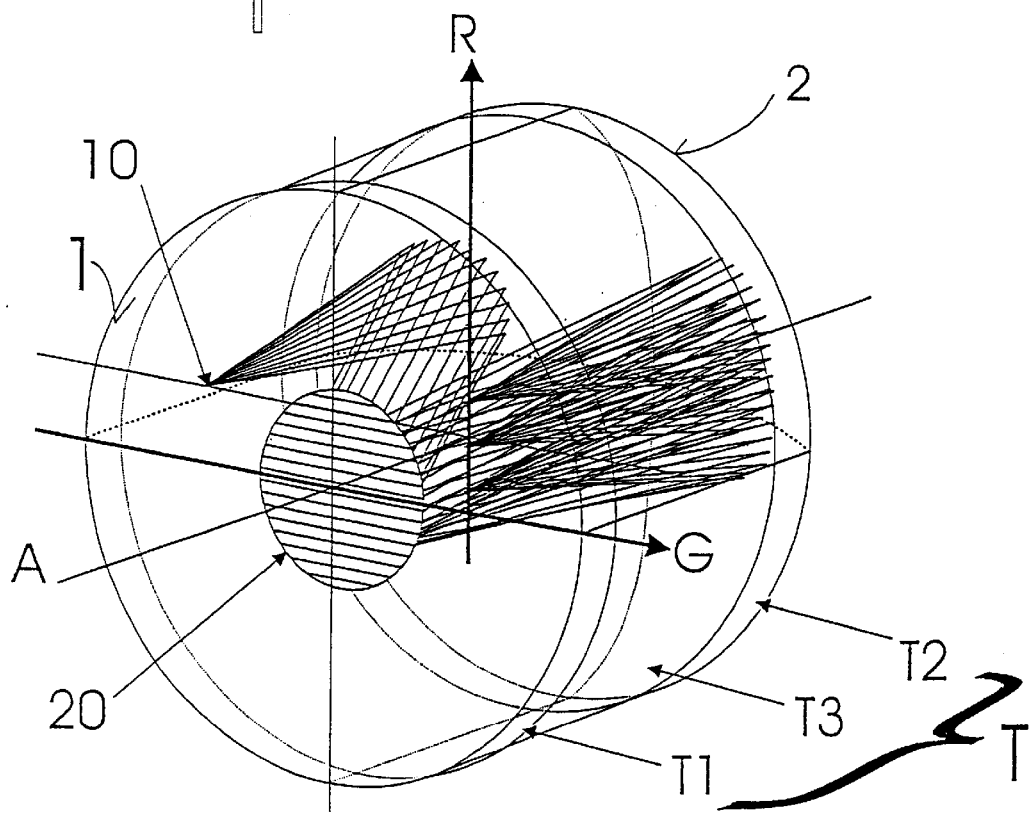

An inherent imaging error is caused by the reflection on the concave mirror outside the optical axis, which impairs the resolution. A negative order of diffraction can be used by way of the suggested arrangement of the light entry and the orientation of the grating—contrary to the positive order of diffraction shown in FIG. 11 of the patent specification, U.S. Pat. No. 4,744,618—so that the light entry and the exit surface are located on the same side of the grating relative to the dispersion direction R, as shown in FIGS. 3 and 4. A substantial compensation of the imaging errors is achieved at least in the resulting direction R of the spectral separation by the specific use of the position of the light entry 10 and a negative order of diffraction, as described above, so that a widening of the focal points in the dispersion direction R is kept small, whereby a good wave length resolution is achieved. Also because of the specific use of the position of the light entry 10 in the suggested arrangement of light entry and grating, all further imaging errors only result in stigmatism, more specifically, an elongation of the focal points essentially perpendicular to the dispersion direction R without reduction in the resolution of the spectrometer. By using adapted photodiodes with unsymmetical shape of the individual photodiode fields, the light in the elongated focal patches is completely detected and the stigmatism has no negative influences on the resolution for the transmission efficiency. A photodiode field is preferably used for the spectrometer which individual photodiodes have a rectangular effective surface, for example, about 25 μm in longitudinal direction (width) and about 500 μm in cross-wise direction (height).

It is apparent from the above and from FIGS. 3 and 4 that a conical diffraction takes place with this basic optical concept of the spectrometer. This is characterized in that, instead of the otherwise common straight focal line, the focal line with the conical diffraction is curved. However, the curvature is so pronounced that no significant errors are created therewith, as long as only the effective height (across the longitudinal direction) of the individual light-sensitive elements (photodiodies, pixel height) of the converter arrangement is sufficiently large which, however, is the case with the commercially available photodiode fields typically used for this purpose.

Although the selected positioning of the light entry and the orientation G of the grating grooves together with the use of a planar, not aberration corrected grating which is not tilted relative to the plane 1 results in the simplest arrangement and, therefore, a simple manufacture, this positioning provides for the achievement of a resolution which is achievable in spectrometer arrangements of comparable size and numerical aperture only with comparably costly manufacturing methods (for example, in the U.S. Pat. No. 4,744, 618 "Demultiplexor" by way of a tilting of the grating from the perpendicular to the axis 40 in FIG. 11 of this patent).

Figure 2:
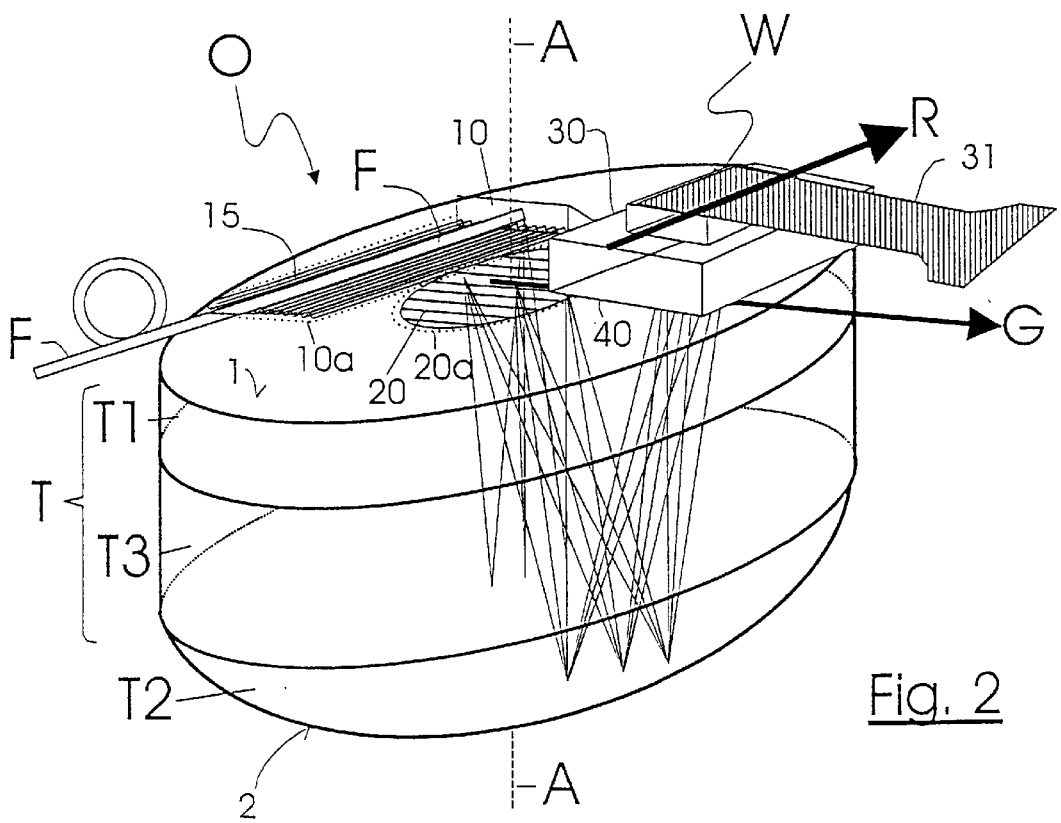

A slightly modified form of the spectrometer in accordance with the invention is illustrated in FIG. 2. It is essentially only distinguished from the embodiment of FIG. 1 in that the detector chip 30 of the converter arrangement W is not positioned directly on the first end surface 1 of the carrier body T, but with an intermediate at least partly transparent spacer 40, whereby this spacer 40 is either a separate adhered part or directly formed in or on the first end surface 1.

FIGS. 6 and 7 show the spacer 40 and the installation of the converter arrangement W in enlarged detail. FIG. 6 shows the bottom view of a typical converter arrangement constructed as a photodiode field, whereby the here freely accessible photodiodes 32 are also recognizable apart from the detector chip 30 and the band cable 31. The spacer 40 has a recess 41 in the upper surface thereof, wherein a bridge 42 is located with a planar fitting surface 43. The detector chip 30 is then mounted to the spacer 40 in such a way that its photodiodes 32 are located immediately on the fitting surface 43 of the bridge 42. It is understood that the spacer 40 is transparent in at least the region of its bridge 42.

The installation of the converter arrangement W on a spacer 40 is advantageous relative to the installation thereof directly onto the first end surface 1, because possible manufacturing tolerances of the (remaining) carrier body T can be compensated by corresponding adjustment of the height of the spacer, so that the photodiodes of the converter arrangement W can be optimally positioned in the focal plane of the light path. Spectral transparency and blocking properties can also be systematically adjusted by specific selection of the material of the spacer 40.

Although advantageous for reasons of production technology, it is not at all essential for the optical concept of the spectrometer in accordance with the invention that the first end surface 1 is planar throughout. It is only essential that it include planar, co-planar or mutually parallel partial regions or partial surfaces in which the optical microstructures of the light entry 10 and the reflecting diffraction grating 20 are positioned as well as the coupling of the detector chip 30 of the converter arrangement W. In the illustrated exemplary embodiments, these partial surfaces are the surface 10a occupied by the groove structure 15 and the microprism 10, the surface 20a occupied by the reflecting diffraction grating 20 and the surface 30a occupied by the detector chip 30 or the planar fitting surface 43 of the spacer 40.

The carrier body T is preferably made of a transparent plastic which is extrudible and/or thermoplastic (heat moldable). Suitable polymer materials are, for example, polycarbonates, PMMA, COC, UVT, Degalan, and the like, whereby the selection of the polymer material depends on its transmission properties with respect to the wave length range of interest. For reasons of production technology, it is advantageous to assemble the carrier body T from at least two, preferably three partial bodies and to cement them together with an appropriately index-matched adhesive. FIGS. 1 and 2 show a preferred division of the carrier body into three partial bodies T1, T2 and T3. The first carrier body T1 is essentially formed as a relatively thin sheet and includes the first end surface 1 with the already mentioned optical structures. The second partial body T2 has the shape of a relatively thin piano-convex lense and has the second, reflective end surface 2. The third partial body T3 is purely cylindrical and is located between the two other partial bodies T1 and T2. Its sole function is to give the whole carrier body T the required height so that the focal plane of the exiting light path is located in or at a small distance from the first end surface 1. The three partial bodies are preferably provided with not-illustrated mechanical structures which facilitate the mutual orientation during assembly.

The location of the focal plane of the exiting light path can, as already mentioned, be adjusted by corresponding selection of the thickness (height) of the third partial body T3. The focal plane can be located in the plane of the diffraction grating 20 (for example, FIG. 1) or slightly above (for example, FIG. 2) or below. An optimal adaptation to different housing shapes of the converter arrangement is thereby possible. To suppress light scatter and to simplify adjustability, it is advantageous to provide a spacer 40 which is adapted to the geometrical shape of the converter arrangement used, which spacer is either cemented as separate part onto the first end surface 1 or formed as microstructure directly thereon. Of course, an air gap can be present between the carrier body T and the light sensitive elements of the converter arrangement W. This is the case, for example, when the photodiodes in the detector housing are not directly accessible but are located behind a window. The focal point of the exiting light path is in that case then at a suitable distance above the first end surface 1, whereby the exact positioning of the detector housing or the detector chip 30 is preferably again adjusted by way of a spacer.

The optical concept (specific positioning of the light entry and orientation of the essentially planar diffraction grating for use in negative order of diffraction, so that light entry and exit coupling are located on one side of the grating, folded light path) and the division of the carrier body into partial bodies enable an especially simple and cost-effective mass production of the spectrometer with the use of comparatively low-priced replication techniques such as, for example, injection molding, hot stamping and extrusion. Alternatively, manufacture from thermosetable plastics or plastics that are settable by exposure to UV or microwave radiation on plastic or glass substrates is possible. The optical concept furthermore allows for a very compact construction and, thereby, provides the prerequisite for miniaturization of the spectrometer. The carrier body T of FIGS. 1 and 2 is typically only about 22 mm wide (diameter) and about 18 mm high, whereby the radius of curvature of the second end surface 2 is about 31 mm. Despite these small dimensions, a spectral resolution of about 5 to 8 $\mu$m is still achievable with a commercially available photodiode field as converter arrangement and with 100/140 $\mu$m fiber as light entry.

The preferred manufacturing sequence of the spectrometer is typically as follows:

- manufacture of the partial body T1 with the structures included thereon (input coupling structure with microprism, structure of the diffraction grating, spacer, if desired) by way of injection molding, whereby the optical structures can also be produced by hot stamping
- reflective coating of the rear surface of the microprism and the diffraction grating structure by masked vapour deposition of aluminum
- manufacture of the partial body T2 with the curved second end surface in an injection molding process
- application (masked) of the aluminum reflective coating onto the curved second end surface and over the total surface or a partial surface thereof
- manufacture of the cylindrical partial body T3 in an injection molding process or from extruded sheet material
- placement and adjustment of the converter arrangement on the partial body T1
- adhesion of partial bodies T2 and T3
- adhesion and adjustment of partial body T1 and T3 (with adhered T2)
- positioning and adhesion of the light guide fiber F
- blackening of the total arrangement.

The light to be measured is supplied into the carrier body T, as already mentioned, preferably through a light guide fiber F in combination with the input coupling structure provided on the first end surface 1 in the form of a microprism 10, whereby the light guide fiber replaces the otherwise conventional entry gap. A commercially available 100/140 $\mu$m index gradient fiber is suited, for example, as the light guide fiber F. However, fibers with smaller cores down to 8 $\mu$m single mode fibers and 125 $\mu$m cladding fibers can also be used. For improved light transmission, two or several light guide fibers can be used at the same time, whereby, of course, the pixel size of the converter arrangement must be taken into consideration. For example, with an acceptable pixel size of 0.5 mm of the converter arrangement, up to three 100/140 $\mu$m index gradient fibers can be used at the same time. When the light guide fiber with the thicker core is used, an entry gap can be provided (for example, up to 100 $\mu$m×700 $\mu$m), which can be formed, for example, directly at the microprism 10. The fastening of the light guide fibers in the groove structure 15 of the first end surface 1 can be achieved, for example, by adhesive covering with a piece of float glass.

A timed sequential three or multi-channel operation can be achieved without additional external fiber multiplexer, when the light to be measured is supplied through, for example, three fibers in adjacent grooves of the groove structure 15. This function is of substantial advantage in connection with the performance of wave length calibrations and the measuring of a reference spectrum.

The scattered light behaviour of the spectrometer in accordance with the invention can be improved by different measures. For example, the numerical aperture can be reduced by reduction of the reflective regions on the second end surface. Furthermore, slot masks can be positioned in the input coupling, especially on the microprism 10. Moreover, masks can be positioned between the individual partial bodies T1 and T3 or T3 and T2 of the carrier body T. Then, finally, wave length ranges which are undesired or not of interest can be filtered out, for example, by way of filters which are positioned between the partial bodies or in series before the converter arrangement.

The spectrometer in accordance with the invention includes altogether, especially an optical arrangement for the capturing of light to be measured and for the separation thereof into spectral portions and a photoelectric converter arrangement subjected to the spectral portions and for the conversion of the spectral portions in corresponding electric signals. The optical arrangement (O) includes an essentially transparent carrier body (T) which is essentially defined by a pair of opposite end surfaces (1, 2) and in which a reflecting diffraction grating (20) and the converter arrangement (W) are positioned and to which the light to be measured is supplied through a light entry (10). The selected positioning of the light entry (10) and the orientation of the essentially planar diffraction grating (G) results in a spectral splitting approximately perpendicular to a line of connection between the light entry and a central point of the planar region (30*a*) wherein the focal points of the individual spectral portions are located. The light entry (10), the planar reflecting diffraction grating (20) and the converter arrangement (W) are positioned on the side of the first (1) of the two end surfaces (1, 2) of the carrier body (T), and the second (2) of the two end surfaces (1, 2) is wholly or partially constructed as a preferably rotations symmetrical, inwardly reflective, concave mirror. The carrier body (T) completely consists of a transparent plastic that includes three optically connected partial bodies (T1, T2, T3) of which a first partial body (T1) includes the first end surface (1) and a second partial body (T2) includes the second end surface (2) of the carrier body (T) and a third partial body (T3) is positioned between the first and the second partial body (T1, T2). Optically effective microstructures are provided on the first end surface (1) which form the light entry (10) and the reflecting diffraction grating (20). The light to be measured is supplied through one or several light guide fibers (F) parallel to the first end surface (1), whereby the effective microstructures positioned on the surface (1) enable a simple installation of this fiber or these fibers.

The spectrometer provides the prerequisites for a strong miniaturization and is very well suited for a simple and cost-effective mass production.

What is claimed is:

1. Spectrometer with an optical arrangement for capturing light to be measured and for splitting said light into spectral portions, said optical arrangement comprising: a light entry, a reflecting diffraction grating; a light exit surface through which the spectrally separated measured light exits, and a carrier body which is at least partly transparent and which is defined by two opposite end surfaces with the light entry, the reflecting diffraction grating and the exit surface being provided on a first of the two end surfaces of the carrier body, and a second of the two end surfaces including a reflective concave mirror for collimating the entering light and reflecting the light onto the reflecting diffraction grating and focusing light diffracted by the reflecting diffraction grating onto the exit surface, the light entry and the exit surface being spaced apart and a dispersion of the light in the exit surface being perpendicular to a line connecting the light entry and the exit surface.

2. Spectrometer according to claim 1, wherein the reflecting diffraction grating is substantially planar.

3. Spectrometer according to claim 1, wherein a plurality of optically effective microstructures are provided on the first end surface for forming the light entry and the reflecting diffraction grating.

4. Spectrometer according to claim 1, wherein the first end surface has at least one of co-planar and parallel planar partial surfaces in which the light entry, the reflecting diffraction grating and a converter arrangement are positioned for converting light focused onto the exit surface into corresponding electrical or electronic signals.

5. Spectrometer according to claim 4, wherein the reflecting diffraction grating is positioned in a partial surface that is substantially in a plane which is perpendicular to an axis of rotation of the concave mirror.

6. Spectrometer according to claim 1, wherein the second end surface has at least one of a spherical and a parabolic shape and is at least partially provided with a highly reflective coating.

7. Spectrometer according to claim 1, wherein the light entry is formed by an input coupling structure which includes a microprism and is provided on the first end surface wherein said coupling structure couples the light to be measured into the carrier body at a relatively small angle to an axis of rotation of the second end surface.

8. Spectrometer according to claim 7, wherein the input coupling structure includes a groove structure for the mechanical positioning of at least one light guide fiber relative to the microprism, through which light guide fiber, the light to be measured is supplied.

9. Spectrometer according to claim 8, wherein the microprism and the groove structure are formed directly on the first end surface of the carrier body.

10. Spectrometer according to claim 1, wherein the diffraction grating is provided by a surface structure of the first end surface of the carrier body, in combination with a reflective coating applied to a local surface structure corresponding to said end surface.

11. Spectrometer according to claim 1, wherein the carrier body is made of substantially transparent plastic which is selected from at least one of pressure settable plastics, heat settable plastic, radiation settable plastics, heat and radiation settable plastics and heat deformable plastics.

12. Spectrometer according to claim 1, wherein the carrier body includes at least two optically connected partial bodies of which a first partial body includes the first end surface and a second partial body includes the second end surface of the carrier body.

13. Spectrometer according to claim 1, wherein the carrier body includes at least three optically interconnected partial bodies, of which a first partial body includes the first end surface and a second partial body includes the second end surface of the carrier body and a third partial body is positioned between the first and second partial bodies.

14. Spectrometer according to claim 13, wherein the first and third partial bodies are constructed as substantially plano-parallel and the second partial body is of a substantially plano-convex shape.

15. Spectrometer according to claim 14, wherein a plano-parallel spacer for a converter arrangement is formed in the first end surface.

16. Spectrometer according to claim 1, further comprising at least two light guide fibers for supplying light to be measured from at least one light source measured.

17. Spectrometer according to claim 6, wherein the coating is aluminum.

18. Spectrometer according to claim 8, wherein the groove structure includes at least one groove having a substantially V-shaped cross section.

19. Spectrometer according to claim 11, wherein the radiation settable plastics are settable by UV radiation.

20. A method of collecting light to be measured and splitting said light into spectral portions in an optical arrangement of a spectrometer, said method comprising the steps of:

projecting light to be measured into a light entry;

collimating the light entered through said light entry by a reflective concave mirror;

reflecting the collimated light onto a reflecting diffraction grating by the reflective concave mirror; and focusing light diffracted from the diffraction grating onto a light exit surface by the reflective concave mirror, wherein said optical arrangement includes a carrier body that is at least partly transparent and is defined by two opposite end surfaces with the light entry, the diffraction grating and the light exit surface being provided on a first of the two end surfaces and a second of the two end surfaces including said reflective concave mirror wherein further the light entry and exit surface are spaced apart and a dispersion of the light in the exit surface is perpendicular to a line connecting the light entry and the exit surface.

* * * * *